United States Patent [19]

Samuels et al.

[11] Patent Number: 4,918,038
[45] Date of Patent: Apr. 17, 1990

[54] PROCESS FOR THE PRODUCTION OF POLYETHYLENE WITH A BROAD AND/OR BIMODAL MOLECULAR WEIGHT DISTRIBUTION

[75] Inventors: Sari-Beth Samuels, Edison; Frederick J. Karol, Belle Mead, both of N.J.

[73] Assignee: Union Carbide Chemicals and Plastics Company Inc., Danbury, Conn.

[21] Appl. No.: 114,040

[22] Filed: Oct. 29, 1987

[51] Int. Cl.⁴ .................... X08F 4/64; X08F 4/68
[52] U.S. Cl. ............................ 502/112; 502/113; 502/119; 502/120; 502/123; 502/125; 502/126; 502/127; 502/128; 526/116; 526/119
[58] Field of Search ............ 502/112, 113, 119, 120, 502/123, 125, 126, 127, 128

[56] References Cited

U.S. PATENT DOCUMENTS

| | | | |
|---|---|---|---|
| 4,124,532 | 11/1978 | Giannini et al. | 502/112 X |
| 4,397,761 | 8/1983 | McDaniel et al. | 502/120 X |
| 4,508,842 | 4/1985 | Beran et al. | 502/112 |
| 4,607,019 | 8/1986 | Best | 502/119 |

FOREIGN PATENT DOCUMENTS 2574801  6/1986  France .

*Primary Examiner*—Patrick P. Garvin
*Attorney, Agent, or Firm*—Saul R. Bresch

[57] ABSTRACT

A process for the production of an ethylene homopolymer or copolymer comprising passing ethylene with or without at least one alpha-olefin comonomer having 3 or more carbon atoms into contact with a mixed catalyst system, under polymerization conditions, said mixed catalyst system comprising:

(a) the reaction product of (i) a vanadium halide having the formula $VX_3$ wherein X is chlorine, bromine, or iodine and each X is alike or different; (ii) a modifier having the formula $BX_3$ or $AlR_{(3-a)}X_a$ and (iii) an electron donor
(b) one of the following:
  (i) a complex having the formula $ZrMg_bX_c(ED)_d$; or
  (ii) a vanadium oxy compound having the formula $VOX_3$, $VOX_2$, $VOX$, or $VO_2X$ wherein X is as defined above, or $VO(OR)_3$
(c) a hydrocarbyl aluminum cocatalyst; and
(d) a halocarbon promoter having the formula $R_eCX_{(4-e)}$ wherein R is hydrogen or an unsubstituted or halo substituted alkyl radical having 1 to 6 carbon atoms; each R is alike or different; X is chlorine, bromine, iodine, or fluorine; each X is alike or different and e is 0, 1, or 2 provided that, if no fluorine is present, e is 2.

4 Claims, 3 Drawing Sheets

4,918,038

PROCESS FOR THE PRODUCTION OF POLYETHYLENE WITH A BROAD AND/OR BIMODAL MOLECULAR WEIGHT DISTRIBUTION

TECHNICAL FIELD

This invention relates to a process for the polymerization of ethylene whereby resins with a broad and/or a bimodal molecular weight distribution are produced.

BACKGROUND ART

For many applications of polyethylene, toughness, strength, and environmental stress cracking resistance are important properties. These properties are enhanced when the polyethylene is of high molecular weight. However, as the molecular weight of the polymer increases, the processibility of the resin usually decreases. By providing a polymer with a broad or bimodal molecular weight distribution, the properties characteristic of high molecular weight resins are retained and processibility, particularly extrudability, is improved. A bimodal molecular weight distribution can be explained as follows: in a traditional molecular weight distribution plot (by size exclusion chromotography) of concentrations of species of specific molecular weight vs. log molecular weight, a frankly multimodal molecular weight distribution would show at least two maxima, two maxima being the characteristic of bimodal. The maxima need not be equivalent in magnitude or widely separated.

Three major strategies have been proposed for the production of polyethylene resins with a bimodal molecular weight distribution. One is post reactor or melt blending, which suffers from the disadvantages brought on by the requirement of complete homogenization and attendant high cost. A second is through the use of multistage reactors, which raises questions of efficiency and, again, cost. The third, and most desirable strategy, is the direct production of a broad or bimodal polyethylene via a single catalyst or catalyst mixture in a single reactor. Such a process would provide component resin portions of the molecular weight distribution system simultaneously in situ, the resin particles being intimately mixed on the subparticle level.

DISCLOSURE OF THE INVENTION

An object of this invention is to provide a catalytic process for the production of polyethylene resin having a broad and/or bimodal molecular weight distribution, which process can be effected in a single reactor.

Other objects and advantages will become apparent hereinafter.

According to the present invention, a process for the production of an ethylene homopolymer or copolymer having a broad and/or bimodal molecular weight distribution has been discovered comprising passing ethylene with or without at least one alpha-olefin comonomer having 3 or more carbon atoms into contact with a mixed catalyst system, under polymerization conditions, said mixed catalyst system comprising:

(a) the reaction product of (i) a vanadium halide having the formula $VX_3$ wherein X is chlorine, bromine, or iodine and each X is alike or different; (ii) a modifier having the formula $BX_3$ or $AlR_{(3-a)}X_a$ wherein X is as defined above; R is an alkyl radical having 1 to 14 carbon atoms; each R is alike or different; and a is 0, 1, or 2 and (iii) an electron donor, which is a liquid Lewis base in which the vanadium halide and modifier are soluble;

(b) one of the following:
 (i) a complex having the formula $ZrMg_bX_c(ED)_d$ wherein X is as defined above; ED is an electron donor, which is a liquid Lewis base in which the precursors of the complex are soluble; b is a number from 1 to 3; c is a positive number equal to or less than 4+2b; and d is a number from 4 to 10; or
 (ii) a vanadium oxy compound having the formula $VOX_3$, $VOX_2$, $VOX$, or $VO_2X$ wherein X is as defined above, or $VO(OR)_3$ wherein R is a monovalent hydrocarbon radical having 2 to 10 carbon atoms and each R can be alike or different, wherein the vanadium halide and the vanadium oxy compound are supported;

(c) a hydrocarbyl aluminum cocatalyst; and (d) a halocarbon promoter having the formula $R_eCX_{(4-e)}$ wherein R is hydrogen or an unsubstituted or halo substituted alkyl radical having 1 to 6 carbon atoms; each R is alike or different; X is chlorine, bromine, iodine, or fluorine; each X is alike or different; and e is 0, 1, or 2 provided that, if no fluorine is present, e is 2.

DETAILED DESCRIPTION

Figure 1:
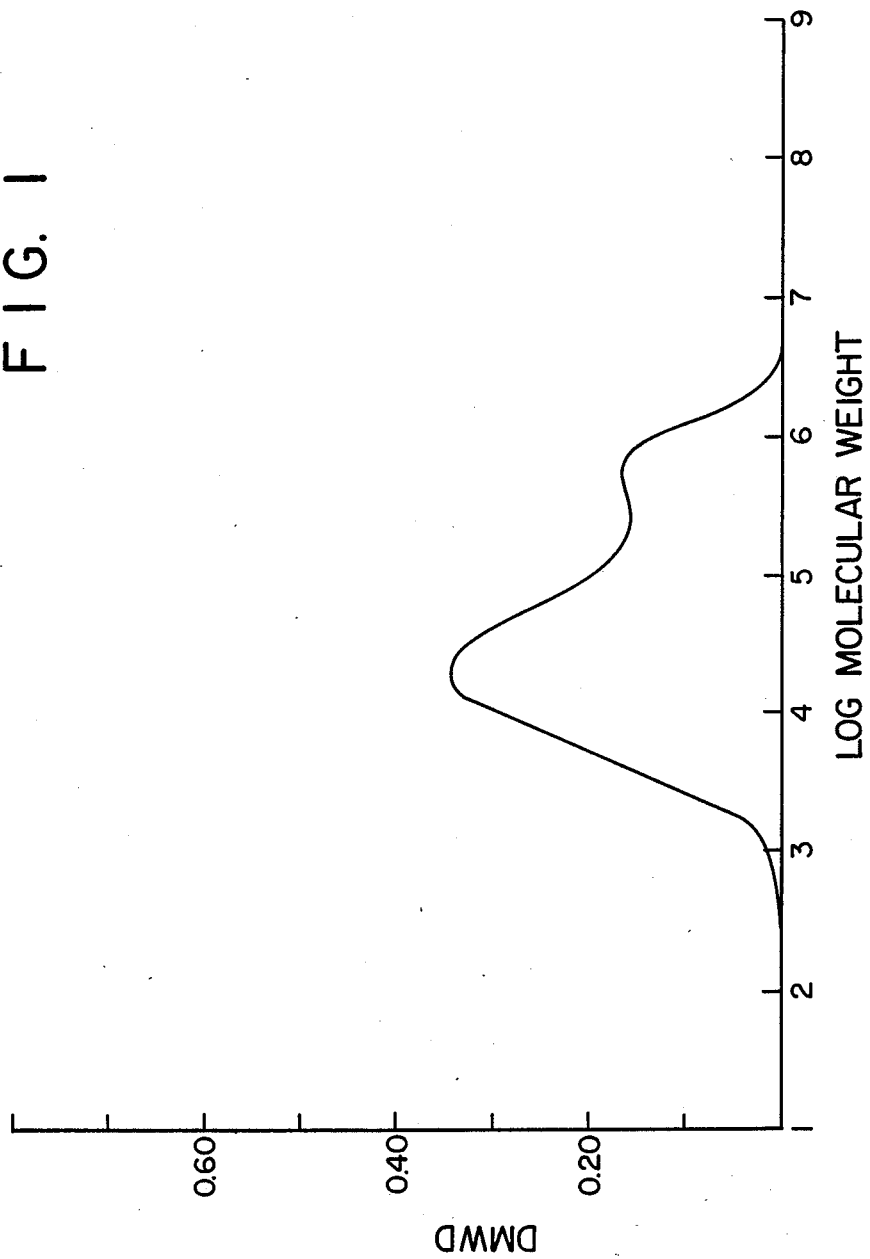
FIG. 1 is a curve showing the desired bimodal molecular weight distribution as achieved by example 2. DMWD stands for differential molecular weight distribution.
Figure 2:
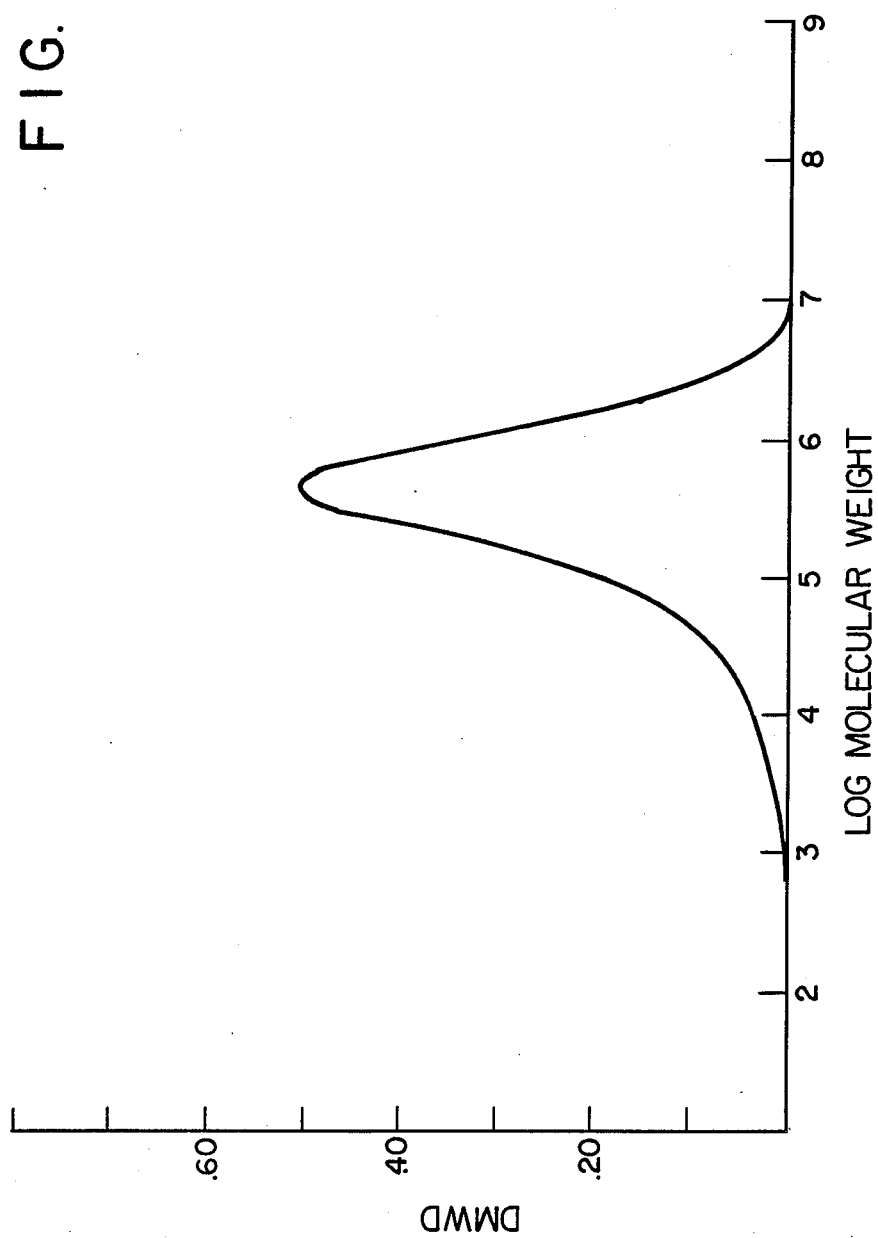
FIGS. 2 and 3 are curves showing the DMWD obtained when a single catalyst system as opposed to a mixed catalyst system is employed. See comparative examples 3 and 4.
Figure 3:
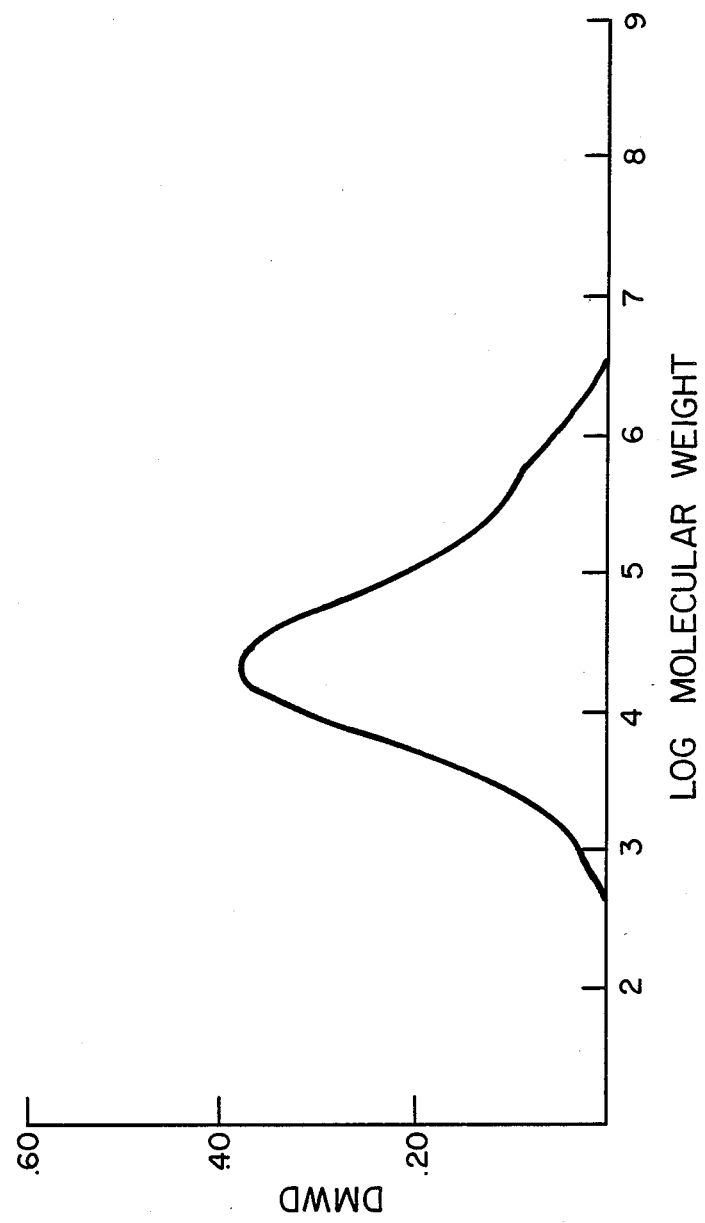

An advantage of subject process is that the shape of the molecular weight distribution can be controlled. The mixed catalyst system used in the process is a mixture of two or more component catalysts, each having a different hydrogen response. If the difference in hydrogen response between the two component catalysts is very large, then the polymer produced by the mixed catalyst system will have a bimodal molecular weight distribution. If the difference in hydrogen response between the component catalysts is large, but not sufficient to produce a product with a bimodal molecular weight distribution, the mixed catalyst system will yield a product with a higher concentration of polymer chains above 500,000 molecular weight than is typically observed for a broad molecular weight distribution product of similar melt index.

The reaction product of vanadium halide, modifier, and electron donor referred to as component (a) and a method for its preparation are disclosed in U.S. Pat. No. 4,508,842 issued on Apr. 2, 1985. The vanadium oxy compounds having the formula $VOX_3$, $VOX_2$, $VOX$, or $VO_2X$ are described in the Encyclopedia of Chemical Technology, Kirk-Othmer, 3rd Edition, John Wiley & Sons, New York, Volume 23, pages 692 and 693 under vanadium oxyhalides. As noted, X can be either chlorine, bromine, or iodine. Each X can also be alike or different. The preferred X is chlorine. The vanadium oxy compound having the formula $VO(OR)_3$ is an organic vanadate or vanadate ester, which can be prepared as described in U.S. Pat. No. 4,014,912 issued on Mar. 29, 1977.

The zirconium complex, which is component (b)(i) above, and its method for preparation are disclosed in U.S. Pat. No. 4,124,532 issued on Nov. 7, 1978. This complex has the formula $ZrMg_bX_c(ED)_d$ wherein X is chlorine, bromine, or iodine and each X is alike or different; ED is an electron donor which is a liquid Lewis base in which the precursors of the complex are soluble; b is a number from 1 to 3; c is a positive number equal to or less than $4+2b$; and d is a number from 4 to 10. Suitable zirconium compounds useful as precursors for the complex are zirconium tetrahalide and zirconium trichloride. Magnesium compounds useful as precursors are those having the formula $MgX_2$ wherein X is as defined above. Suitable examples are $MgCl_2$, $MgBr_2$, and $MgI_2$. Anhydrous $MgCl_2$ is a preferred compound.

The publication and patents referred to in this specification are incorporated by reference herein.

The electron donors used in the catalyst systems are organic compounds, liquid at temperatures in the range of about 0° C. to about 200° C. They are also known as Lewis bases. Suitable zirconium, magnesium, and vanadium precursors are soluble in the electron donor.

Electron donors can be selected from the group consisting of alkyl esters of aliphatic and aromatic carboxylic acids, aliphatic ketones, aliphatic amines, aliphatic alcohols, alkyl and cycloalkyl ethers, and mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydrofuran, and ethyl propionate.

The vanadium compounds which are of interest here are vanadium trihalides wherein the halogen is chlorine, bromine, iodine, or mixtures thereof. Examples of these halides are $VCl_3$, $VBr_3$, and $VI_3$. Examples of oxyhalides of vanadium are $VOCl_3$, $VOCl_2$, $VOCl$, and $VO_2Cl$. The organic vanadates are exemplified by tri-isobutyl vanadate, tri-n-butyl vanadate, tri-2-ethylhexyl vanadate, and triethyl vanadate. The vanadium compounds can be in the +3, +4, or +5 oxidation states and can have from 6 to 30 carbon atoms.

The modifier has the formula $BX_3$ or $AlR_{(3-a)}X_a$ wherein X is chlorine, bromine, or iodine and each X is alike or different; R is an alkyl radical having 1 to 14 carbon atoms; each R is alike or different; and a is 0, 1, or 2. Preferred modifiers include alkylaluminum mono- and dichlorides wherein each alkyl radical has 1 to 6 carbon atoms, and boron trichloride. A particularly preferred modifier is diethyl aluminum chloride. About 0.1 to about 10 mole, and preferably about 0.2 to about 2.5 moles, of modifier are used per mole of electron donor. When the modifier is used it is considered to be part of the titanium and/or vanadium complex.

The hydrocarbyl aluminum cocatalyst can be represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be alike or different; and each R, which is a hydrocarbyl radical, has 1 to 20 carbon atoms, and preferably 1 to 10 carbon atoms. Further, each alkyl radical can be straight or branched chain and such hydrocarbyl radical can be a mixed radical, i.e., the radical can contain alkyl, aryl and/or cycloalkyl groups. Examples of suitable radicals are: methyl, ethyl, propyl, isopropyl, butyl, isobutyl, tert-butyl, pentyl, neopentyl, hexyl, 2-methylpentyl, heptyl, octyl, issooctyl, 2-ethylhexyl, 5,5-dimethylhexyl, nonyl, decyl, isodecyl, undecyl, dodecyl, phenyl, phenethyl, methyloxyphenyl, benzyl, tolyl, xylyl, naphthyl, naphthal, methylnaphthyl, cyclohexyl, cycloheptyl, and cyclooctyl.

Examples of hydrocarbyl aluminum compounds are as follows: triisobutylaluminum, trihexylaluminum, diisobutylaluminum hydride, dihexylaluminum hydride, isobutylaluminum dihydride, hexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. The preferred hydrocarbyl aluminums are triethylaluminum, triisobutylaluminum, trihexylaluminum, diisobutylaluminum hydride, and dihexylaluminum hydride.

The halocarbon promoter can have the formula:

$$R_eCX_{(4-e)}$$

wherein R is hydrogen or an unsubstituted or halo substituted alkyl radical having 1 to 6 carbon atoms; each R is alike or different; X is chlorine, bromine, iodine, or fluorine; each X is alike or different; and e is 0, 1, or 2 provided that, if no fluorine is present, e is 2. Suitable promoters are $CH_2Cl_2$, $CFCl_3$, $CH_2BrCl$, and $ClCF_2CCl_3$; of which difluorotetrachloroethane and methylene dichloride are preferred.

Mixtures of the various components of the mixed catalyst system can be used, if desired.

The vanadium based complexes or compounds mentioned above are supported. Silica is the preferred support. Other inorganic oxides useful as supports are aluminum phosphate, alumina, silica/alumina mixtures, silica modified with an organoaluminum compound such as triethylaluminum, and silica modified with diethylzinc. A typical support is a solid, particulate porous material essentially inert to the polymerization. It is used as a dry powder having an average particle size of about 10 to about 250 microns and preferably about 30 to about 100 microns; a surface area of at least about 3 square meters per gram and preferably at least about 50 square meters per gram; and a pore size of at least about 80 Angstroms and preferably at least about 100 Angstroms. Generally, the amount of support used is that which will provide about 0.05 to about 0.5 millimole of vanadium per gram of support and preferably about 0.2 to about 0.5 millimole of vanadium per gram of support. Impregnation of the abovementioned catalysts into, for example, silica is accomplished by mixing the complex and silica gel in the electron donor solvent followed by solvent removal under reduced pressure. The vanadium halide and the vanadium oxy compound can share a common support. The zirconium based catalyst is generally not supported, but can be if desired.

The catalyst precursors can be either added separately to the polymerization reactor or dry blended together prior to addition. Premixing outside of the reactor is accomplished by physically blending the catalyst precursors in an inert atmosphere.

The modifier, cocatalyst, and promoter can be added to the complexes either before or during the polymerization reaction. The modifier is usually introduced into the vanadium complex, i.e., component (a), prior to the introduction of the vanadium complex into the mixed catalyst system. The cocatalyst and promoter are preferably added separately neat or as solutions in an inert solvent, such as isopentane, to the polymerization reaction at the same time as the flow of the ethylene is initiated.

The ethylene polymerization can be conducted in the slurry or gas phase using conventional techniques. The density of the ethylene copolymer produced may be varied over a wide range depending upon the amount of alpha-olefin comonomer added and upon the particular comonomer employed. The greater the mole percent of alpha-olefin comonomer, the lower the density. Alpha-olefins having 3 to 10 carbon atoms are suitable. Preferred alpha-olefins are 1-butene, 1-hexene, 4-methyl-1-pentene, and 1-octene. The mole ratio of comonomer to ethylene is usually in the range of about 0.001 to about 0.5 mole of comonomer per mole of ethylene.

The use of more than one reactor, connected in series, enhances the bimodal molecular weight distribution.

A chain transfer agent, such as hydrogen or diethyl zinc, can be used to terminate the polymer chain. Usually the ratio of hydrogen to ethylene will vary between about 0.001 to about 2.0 moles of hydrogen per mole of ethylene.

The use of a mixed catalyst system in a single reactor or in a series of reactors allows for complete tailoring of the resin molecular weight distribution to suit product applications. By providing the variations in molecular weight distribution in one product, the various resin particles are intimately mixed rendering costly post-reactor compounding unnecessary. Intimate mixing exists on the subparticle level as well thus providing optimum product properties, e.g., no gels are formed. The catalysts are easy to prepare using conventional techniques and exhibit excellent activity, hydrogen response, and comonomer response. The results are achieved by creating catalysts with diverse active species having different chain transfer and/or comonomer responses.

The invention is illustrated by the following examples:

EXAMPLES 1 TO 4

(i) The zirconium complex used in the examples is prepared according to the procedure described in U.S. Pat. No. 4,124,532. In a 200 milliliter flask equipped with a mechanical stirrer is placed 2.7 grams (28 millimoles) of anhydrous $MgCl_2$ and 125 milliliters of tetrahydrofuran. To this mixture, 3.25 grams (14 millimoles) $ZrCl_4$ is added over 30 minutes while stirring. During this period, the mixture is heated to 60° C. to completely dissolve the material. A white precipitate is formed. The resulting catalyst contains an atomic ratio of Mg:Zr of 2:1; an atomic ratio of Zr:Cl of 1:8; and a molar ratio of tetrahydrofuran:Zr greater than or equal to 1:1.

(ii) The vanadium trihalide complex used in the examples is prepared according to the procedure described in U.S. Pat. No. 4,508,842. To a flask containing 4 liters of anhydrous tetrahydrofuran are added 34 grams of $VCl_3$ (0.216 mole). The mixture is stirred for 5 hours at 65° C. under a nitrogen blanket until the $VCl_3$ is dissolved. To this solution is added 800 grams of silica (dehydrated by heating to 600° C.). Stirring is continued for 4 hours at 65° C. The flask is vented and the solution is dried at 70° C. to the mud stage. The temperature is dropped to 45° C. and a nitrogen purge is used until a 4 to 10 percent by weight tetrahydrofuran level is reached in the resulting precursor. The vanadium complex so produced is a free-flowing solid containing 0.3 millimole of vanadium per gram of supported vanadium complex. The mole ratio of tetrahydrofuran to $VCl_3$ is 3:1. The solid is removed from the flask and stored under nitrogen.

(iii) To a flask containing 4 liters of anhydrous isopentane are added 500 grams of the vanadium complex (ii). To this mixture is added, with stirring, a 25 weight percent solution of diethylaluminum chloride (DEAC) in anhydrous hexane. The DEAC is referred to as a modifier and is employed in an amount sufficient to provide a final dry catalyst composition containing approximately three percent aluminum by weight. This mixture is heated to 45° C. and purged with nitrogen until the product is a free-flowing powder containing 0.27 millimole of V per gram and a molar ratio of DEAC to V of 4.5:1. The vanadium precursor is then removed from the flask and stored under nitrogen.

The polymerization of ethylene is conducted in a one liter autoclave equipped with a mechanical overhead stirrer and an external temperature regulating jacket. The autoclave is capable of providing the continuous addition of ethylene at a fixed preset pressure. The reactor is fitted with thermocouples to allow monitoring of the temperature of the external jacket and the internal temperature of the reactor during the polymerization. The ethylene feed line to the reactor is fitted with an electronic gas flow meter to allow the continuous monitoring of the ethylene flow to the reactor. All manipulation of the polymerization reaction components are conducted using airless techniques to rigorously exclude atmospheric oxygen and water.

The reactions are conducted in a slurry of dry, deoxygenated hexane. The autoclave is charged with 600 milliliters of hexane and, optionally, 20 milliliters of 1-hexene.

At a temperature of 50° C., a solution of 25 weight percent trialkylaluminum in hexane (based on the weight of the hexane) is added by syringe to the reactor in a molar ratio of Al:total transition metal of 40:1. The aluminum alkyl acts as a cocatalyst for both the zirconium based catalyst component and the vanadium based catalyst component and, by adding the aluminum alkyl to the reactor first, it can scavenge any trace impurities. The addition of catalyst to the reactor is made with the careful exclusion of air from the system. Typically, 0.05 millimole of total catalyst is charged to the reactor.

The promoter, e.g., $CFCl_3$, is then charged into the reactor as a 1.0 molar hexane solution. It is added by syringe with, as before, precautions being taken to exclude air from the reactor system. The molar ratio of promoter to total transition metal is 40:1.

The reactor is sealed immediately following the addition of the last component and is then heated to 60° C. The reactor is flushed with hydrogen and then pressurized with hydrogen. Hydrogen is added to regulate the polymer molecular weight. Heating is continued to 75° C. at which point the reactor is pressurized with ethylene to a pressure of 160 psig. The ethylene flow into the reactor is monitored with a mass flowmeter and the internal and jacket temperatures of the reactor are continuously monitored during the polymerization reaction. The jacket temperature is regulated to maintain the internal temperature of the reactor at 85° C.

The polymerization is conducted for 60 minutes. At the time the ethylene flow to the reactor is stopped, the reactor is vented to ambient pressure, and the jacket is flushed with cold water to bring the internal temperature to ambient as quickly as possible. The polymer/hexane slurry is removed from the reactor, stabilizers are added, and the solvent is allowed to evaporate overnight. The polymer is dried in a vacuum oven at 80° C. and then weighed to determine the polymer yield.

In examples 1 and 2, the two catalysts, (i) and (iii), are added separately and simultaneously to the polymerization reactor.

Variables and results are shown in Table I.

1. $H_2$ (psi) = hydrogen partial pressure in pounds per square inch.
2. The activity of the catalyst systems is measured in grams of polyethylene per millimole of total transition metal per hour per 100 psi of ethylene.
3. MI = Melt index: ASTM D-1238, Condition E. Measured at 190° C. and reported as decigrams per minute.
4. MFR = Melt flow ratio: Ratio of Flow Index to Melt Index. FI = Flow index: ASTM D-1238, Condition F. Measured at 10 times the weight used in the melt index test above.
5. Mw = weight average molecular weight.
6. Mn = number average molecular weight.
7. Mw/Mn = polydispersity, a measure of the breadth of the molecular weight distribution.

TABLE I

| Example | Catalyst | $H_2$ (psi) | Activity | MI (dg/min) | MFR | Mw/Mn |
|---|---|---|---|---|---|---|
| 1 | (i)+(iii) | 20 | 580 | 4.3 | 61 | 21 (bimodal) |
| 2 | (i)+(iii) | 5 | 620 | no flow index | — | 15.2 (bimodal) |
| 3 | (i) | 5 | 550 | no flow index | — | 9.5 |
| 4 | (iii) | 5 | 1560 | 1.7 | 58 | 10.6 |

EXAMPLES 5 TO 19

Definitions of terms used in the examples:

1. Activity = grams of polyethylene per millimole of total transition metal per hour per 100 psi of ethylene.
2. mmol = millimole
3. psi = pounds per square inch.
4. hr = hour
5. TEAL = triethylaluminum
6. TIBA = triisobutylaluminum
7. DEAC = diethylaluminum chloride
8. THF = tetrahydrofuran
9. MI = melt index expressed in dg/min, i.e., decigrams per minute. ASTM D-1238, Condition E. Measured at 190° C.
10. FI = Flow Index. ASTM D-1238, Condition F. Measured at ten times the weight used in the melt index test above.
11. MFR = melt flow ratio. Ratio of Flow Index to Melt Index.
12. Mw = weight average molecular weight
13. Mn = number average molecular weight
14. Polydispersity = a measure of the breadth of the molecular weight distribution. It is represented by the ratio Mw/Mn.
15. CHMWS = concentration of high molecular weight species greater than 500,000 Daltons The following catalyst precursors are used in the examples:

(iii) $VCl_3.3THF$ complex impregnated into silica and then modified with DEAC. The molar ratio of DEAC to V is 4.5 to 1 in this catalyst and the following catalysts in which DEAC is present. This catalyst is a complex, which is the reaction product of $VCl_3.3THF$ and DEAC. For preparation, see (ii) and (iii) in Examples 1 to 4.

(iv) $VOCl_3$ impregnated into silica. The vanadium oxychloride/silica component of the catalyst is prepared according to the following procedure: to a flask containing 20 milliliters of anhydrous hexane is added 120 milligrams of $VOCl_3$ (0.66 millimole). The mixture is stirred for 1 hour at 25° C. under a nitrogen blanket. To this solution are added 3 grams of silica (dehydrated by heating at 600° C.). The flask is vented and the slurry is dried at 50° C. The resulting free flowing powder has a vanadium loading of 0.2 millimole per gram of silica.

(v) $VOCl_3$ and DEAC modified $VCl_3.3THF$ impregnated into the same silica support. This catalyst is a complex, which is the reaction product of $VOCl_3$, $VCl_3.3THF$, and DEAC. The preparation combines the procedures for (i) and (ii) above.

All catalyst components are maintained in an anhydrous environment.

Polymerization of ethylene is conducted in a conventional closed slurry laboratory reactor having a capacity of 1 liter under standard conditions, i.e., in 0.6 liter hexane at a total pressure of 160 psi. The catalysts used in each example are either preblended and added to the reactor as a mixture or are added through separate catalyst tubes. After the catalysts are added, the reactor is charged with a cocatalyst TIBA or TEAL, and a promoter, $CFCl_3$, as a solution in hexane. Hydrogen is charged to the reactor at 60° C. and the polymerizations are conducted at 85° C. for one hour. 0.03 millimole of total vanadium, a mole ratio of TEAL to total vanadium of 40:1, and a mole ratio of $CFCL_3$ to total vanadium of 40:1 are used.

Variables and results are set forth in Table II.

TABLE II

| Example | Catalyst 1 | Catalyst 2 | $H_2$ (psi) | Activity | MI (dg/min) | MFR | polydispersity (Mw/Mn) | CHMWS |
|---|---|---|---|---|---|---|---|---|
| 5 | (iv) | (iii) | 1 | 1720 | 0.07 | 76 | 20 | 20 |
| 6 | (v) | — | 5 | 885 | 0.3 | 82 | 17 | 12 |
| 7 | (iv) | (iii) | 20 | 730 | 0.7 | 83 | 18 | 12 |
| 8 | (iv) | — | 20 | 1050 | 0.3 | 101 | 19 | 8 |
| 9 | — | (iii) | <1 | 1400 | 0.7 | 61 | 12 | 6 |

TABLE II-continued

| Example | Catalyst 1 | Catalyst 2 | H$_2$ (psi) | Activity | MI (dg/min) | MFR | polydispersity (Mw/Mn) | CHMWS |
|---|---|---|---|---|---|---|---|---|
| 10 | — | (iii) | 20 | 1060 | 49 | 37 | 11 | 2 |

We claim:

1. A mixed catalyst system comprising
   (a) the reaction product of (i) a vanadium halide having the formula VX$_3$ wherein X is chlorine, bromine, or iodine and each X is alike or different; (ii) a modifier having the formula BX$_3$ or AlR$_{(3-a)}$X$_a$ wherein X is as defined above; R is an alkyl radical having 1 to 14 carbon atoms; each R is alike or different; and a is 0, 1, or 2; and (iii) an electron donor, which is a liquid Lewis base in which the vanadium halide and modifier are soluble, said reaction product being supported;
   (b) a complex having the formula ZrMg$_b$X$_c$(ED)$_d$ wherein X is as defined above; ED is an electron donor, which is a liquid Lewis base in which the precursors of the complex are soluble; b is a number from 1 to 3; c is a positive nubmer equal to or less than 4+2b; and d is a number from 4 to 10;
   (c) a hydrocarbyl aluminum cocatalyst; and
   (d) a halocarbon promoter having the formula R$_e$CX$_{(4-e)}$ wherein R is hydrogen or an unsubstituted or halo substituted alkyl radical having 1 to 6 carbon atoms; each R is alike or different; X is chlorine, bromine, iodine, or fluorine; each X is alike or different; and e is 0, 1, or 2 provided that, if no fluorine is present, e is 2.

2. The mixed catalyst system defined in claim 1 wherein the electron donors are alkyl esters of aliphatic and aromatic carboxylic acids, aliphatic ketones, aliphatic amines, aliphatic alcohols, alkyl and cycloalkyl ethers, or mixtures thereof, each electron donor having 2 to 20 carbon atoms.

3. The mixed catalyst system defined in claim 1 wherein component (a) is the reaction product of vanadium trichloride, diethylaluminum chloride, and tetrahydrofuran, said reaction product impregnated on a silica support.

4. The mixed catalyst system defined in claim 1 wherein component (b) is the complex ZrMg$_2$Cl$_8$·(tetrahydrofuran)$_6$.

* * * * *